(12) United States Patent
Habeebullah

(10) Patent No.: US 9,383,142 B2
(45) Date of Patent: Jul. 5, 2016

(54) EVAPORATION COOLER AND PAD

(71) Applicant: UMM AL-QURA UNIVERSITY, Makkah (SA)

(72) Inventor: Turki Mohammed Abdulkarim Habeebullah, Makkah (SA)

(73) Assignee: UMM AL-QURA UNIVERSITY, Makkah (SA)

( * ) Notice: Subject to any disclaimer, the term of this patent is extended or adjusted under 35 U.S.C. 154(b) by 660 days.

(21) Appl. No.: 13/727,536

(22) Filed: Dec. 26, 2012

(65) Prior Publication Data

US 2014/0174116 A1 Jun. 26, 2014

(51) Int. Cl.
*F28C 3/08* (2006.01)
*F24F 5/00* (2006.01)
*F24F 6/04* (2006.01)

(52) U.S. Cl.
CPC .............. *F28C 3/08* (2013.01); *F24F 5/0035* (2013.01); *F24F 6/04* (2013.01); *F24F 2006/046* (2013.01); *Y10T 29/49359* (2015.01)

(58) Field of Classification Search
CPC ............. F28C 3/08; F24F 6/04; F24F 5/0035; F24F 2006/046; Y10T 29/49359
USPC .......................................... 261/30, 84, 119.1
See application file for complete search history.

(56) References Cited

U.S. PATENT DOCUMENTS

| | | | | |
|---|---|---|---|---|
| 2,121,384 A * | 6/1938 | Gray | ................. | A47K 7/02 15/105 |
| 2,576,140 A * | 11/1951 | Pennington | ................. | 62/314 |
| 2,869,253 A | 1/1959 | Sachs | | |
| 3,191,915 A * | 6/1965 | Goettl | ................. | 261/97 |
| 3,290,866 A * | 12/1966 | Schonrock | ................. | F04D 29/424 126/113 |
| 3,323,784 A * | 6/1967 | Fazio | ................. | F24F 3/12 126/113 |
| 4,276,241 A * | 6/1981 | Stewart et al. | ................. | 261/92 |
| 4,588,535 A * | 5/1986 | Foidl | ................. | B01D 53/34 261/115 |
| 4,698,979 A * | 10/1987 | McGuigan | ................. | F24F 1/022 62/171 |
| 4,711,294 A * | 12/1987 | Jacobs | ................. | F24F 3/153 165/230 |
| 4,789,262 A * | 12/1988 | Sanchez | ................. | 401/201 |

(Continued)

FOREIGN PATENT DOCUMENTS

| | | |
|---|---|---|
| GB | 13945 | 0/1898 |
| GB | 1457433 | 12/1976 |
| WO | WO 01/79519 | 10/2001 |

OTHER PUBLICATIONS

"Evaluation of the performance of local fibers in evaporative cooling", F. Al-Sulaiman, Energy Conversion and Management, vol. 43, issue 16, Nov. 2007, pp. 2267-2273, (Abstract only, 2 sheets).

*Primary Examiner* — Allen Flanigan
*Assistant Examiner* — Kun Kai Ma
(74) *Attorney, Agent, or Firm* — Richard C. Litman

(57) ABSTRACT

The evaporative cooler and pad operates on the principle of cooling the air by evaporation of water passing through one or more evaporator pads in the cooler. The evaporation of water cools the air as it is drawn through the cooler by an internal fan. The pads of the evaporative cooler and pad are formed of luffa sponge fibers. The cooler may include a device for dispensing antimicrobial and/or antifungal agents into the water reservoir of the cooler. Alternatively, the pads may be pretreated with antimicrobial and/or antifungal agents. A cooling fan is provided in the interior of the cooler to blow cooled, humidified air over the surface of the water in the reservoir before the water is passed through the evaporator pads, thereby increasing the cooling efficiency of the system.

12 Claims, 2 Drawing Sheets

(56) References Cited

U.S. PATENT DOCUMENTS

| | | | | |
|---|---|---|---|---|
| 4,835,981 A | * | 6/1989 | Rinholen | 62/229 |
| 4,882,911 A | * | 11/1989 | Immel | F25D 21/14 |
| | | | | 261/119.1 |
| 5,058,227 A | * | 10/1991 | Schoenfelder | A47C 21/044 |
| | | | | 261/119.1 |
| 5,286,377 A | * | 2/1994 | Galvan | C02F 1/688 |
| | | | | 210/198.1 |
| 2005/0056042 A1 | * | 3/2005 | Bourne | F24F 3/044 |
| | | | | 62/310 |
| 2005/0133942 A1 | * | 6/2005 | Schuld | 261/106 |
| 2005/0200031 A1 | * | 9/2005 | Campbell | F24F 6/02 |
| | | | | 261/72.1 |

* cited by examiner

EVAPORATION COOLER AND PAD

BACKGROUND OF THE INVENTION

1. Field of the Invention

The present invention relates generally to devices and systems for cooling the air, and particularly to an evaporative cooler and pad in which the conventional evaporative cooler pads of wood fiber are replaced with evaporative cooler pads made of luffa sponge, and in which antifungal and antibacterial agents are added to the water used to wet the pads.

2. Description of the Related Art

A number of different principles for cooling air have been developed in the past. One of the earliest of those principles is the evaporative cooler, wherein water is passed through wet porous air filters and air is drawn through those filters. The moisture evaporates in the air as it is drawn through the filters. The air is cooled by the latent heat of evaporation absorbed from the air as the water changes phase from liquid to vapor. This principle works well in drier climates with relatively low ambient humidity, decreasing the temperature of the air passing through the cooler by perhaps as much as 15° C.

However, few improvements have been made to the evaporative cooling principle since its development. Relatively few materials have been developed for forming the porous pads, with those materials not necessarily being particularly efficient at distributing the moisture as fine droplets to promote evaporation. Moreover, such coolers by their nature contain relatively warm, moist components therein, which provide a near ideal site for the propagation of potentially harmful microbes, fungal spores, and the like. Also, many such coolers are constructed with the lower portion of the cooler shell forming a water reservoir. The water in the reservoir receives heat, not only from the ambient environment immediately outside the cooler, but also from the electric motor used to power the fan of the cooler. This water is passed through the filters for evaporation, but it will be seen that the use of relatively warm water in the evaporation cycle is not optimally efficient.

Thus, an evaporative cooler and pad solving the aforementioned problems is desired.

SUMMARY OF THE INVENTION

The evaporative cooler and pad includes a pad formed from Luffa sponge material (*Luffa aegyptiaca*), which provides a number of advantages over the cellulosic and shredded wood fiber materials often used for such pads. The Luffa fibers are formed into a plurality of plies or sheets and compressed to provide a density of about 175 mg/cm$^3$, which has been found through experimental test to provide optimum water absorption and evaporation for use as an evaporative cooler pad. The luffa pad may be treated with various antimicrobial and antifungal agents in order to reduce the propagation of such microbes and fungi in the evaporative cooler system.

Alternatively, the cooler itself may include a dispenser therein for dispensing antimicrobial and/or antifungal agents. The cooler contains a water reservoir in its base. The water level is controlled by a float valve or the like. The water is used to moisten the evaporative pads of the cooler. An antifungal and/or antimicrobial agent dispenser may be provided to dispense such agents into the water to preclude microbial and/or fungal growth in the relatively warm water and in components moistened by the water. In addition, a fan may be provided within the cooler structure to blow cooled, humidified air over the surface of the water in the cooler in order to cool the water supply before it passes through the evaporator pads.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
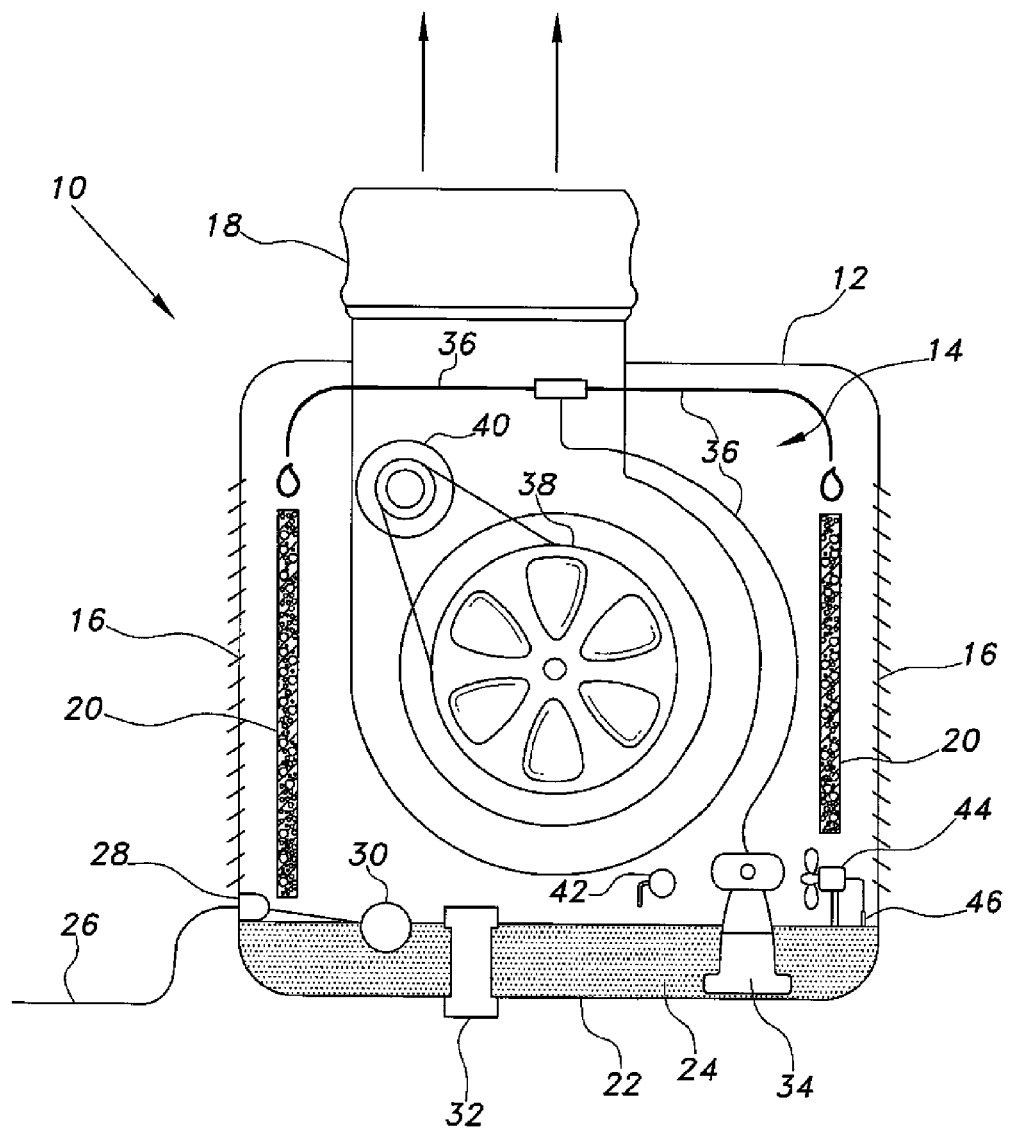
FIG. 1 is a diagrammatic elevation view in section of an evaporative cooler and pad according to the present invention, illustrating various features and details thereof.

The evaporative cooler and pad includes an evaporative cooler 10 having a hollow housing 12 formed of sheet metal, plastic, and/or any other conventional housing material. The housing 12 defines an interior volume 14 therein, and has porous walls 16 to allow airflow into the housing 12. The means providing the porosity for the walls 16 may comprise louvers, a grill, etc. An air outlet 18 extends from the housing 12 to allow cooled and humidified air to be expelled therefrom.

The housing 12 includes porous evaporator pads 20 disposed immediately within each of the porous walls 16, situated to require that air drawn into the housing 12 will pass through the evaporator pads 20. The evaporator pads 20 are preferably formed of at least one sheet of luffa sponge material, and most preferably of a plurality of sheets of such material pressed together to form a single, cohesive, porous evaporator pad. Luffa sponges are the fibrous interiors of the fruits of the luffa sponge gourd plant (*Luffa aegyptiaca*), which is grown in a number of countries throughout the world, including the United States. The method of forming such an evaporator pad 20 of luffa material is described in detail further below. The specific species of luffa, i.e., *Luffa aegyptiaca*, is selected due to its superior air and liquid porosity when dried and when moistened with water in comparison with other evaporator pad material and in comparison with other luffa plant species. The *Luffa aegyptiaca* is also very economical to produce in comparison with other luffa plant species and other plants harvested and processed to form evaporator pads. The evaporator pads 20 may optionally be treated with one or more bactericidal, fungicidal, deodorant, and/or scent agents according to a procedure that is also described in detail further below.

The lower portion of the cooler housing 12 forms a water reservoir 22. The water 24 contained therein provides the water supply for moistening the evaporator pads 20. Water is provided under pressure from a supply line 26 to an inlet valve 28. Water flow through the inlet valve 28 is controlled by a float 30. Alternatively, other water control valve types may be substituted for the float valve 28. An overflow tube 32 may be provided through the bottom of the housing 12 to prevent an excessively high head of water in the reservoir 22 in the event that the valve 30 sticks open. A pump 34 draws water from the reservoir 22 and distributes it to the evaporator pads 20 via water distribution lines 36.

Air is drawn into the interior volume 14 of the housing 12 and through the evaporator pads 20 by a high volume, low pressure belt driven fan 38 (squirrel cage, etc.). The cooled and humidified air is then expelled from the housing 12 through the air outlet 18. The fan 38 is powered by a motor 40.

Conventional electrical wiring (not shown) is used to supply electrical energy to the motor 40 and to the water pump 34. In addition to the above-described structure, the housing 12 may contain a dispenser 42 for dispensing one or more bactericidal, fungicidal, deodorant, and/or scent agents therefrom. These agents are selected from conventional agents used to control the growth of microorganisms and the like. The agent dispenser 42 delivers the agent(s) into the water 24 in the water reservoir 22. Thus, the sterilized, deodorized, and/or scented water is supplied to the evaporator pads 20 through the mechanism described further above. The agent(s) prevent the growth of microorganisms and/or other undesirable matter from growing or spreading in the evaporator pads 20 to prolong the life of the pads.

The water that is passed through the evaporator pads 20 is drawn from the water reservoir 22, as noted further above. As a result, the water in the reservoir tends to become warm over a prolonged period due to the relatively high ambient temperatures of the environment of use of the evaporative cooler, and also due to the heat emitted by the electrical components within the cooler housing 12, particularly the fan drive motor 40 and water pump 34. While the warmer water may facilitate evaporation in the pads 20, the higher water temperature in the reservoir 22 tends to transfer to the incoming air as it passes through the housing 12. The result is that the temperature of the treated air is slightly warmer than would otherwise be the case. Accordingly, a water cooling fan 44 is provided within the housing 12 to blow air over the surface of the water 24 in the water reservoir. Even though the treated air passing through the housing 12 has been humidified, the humidity is somewhat less than 100%. This allows some additional evaporation to occur from the surface of the water 24 in the reservoir 22, which is facilitated by the fan 44. A temperature probe and thermostat 46 may be provided to control the operation of the fan 44 so that the fan 44 is only being actuated when the temperature probe and thermostat sense a temperature of some predetermined level.

Figure 2:
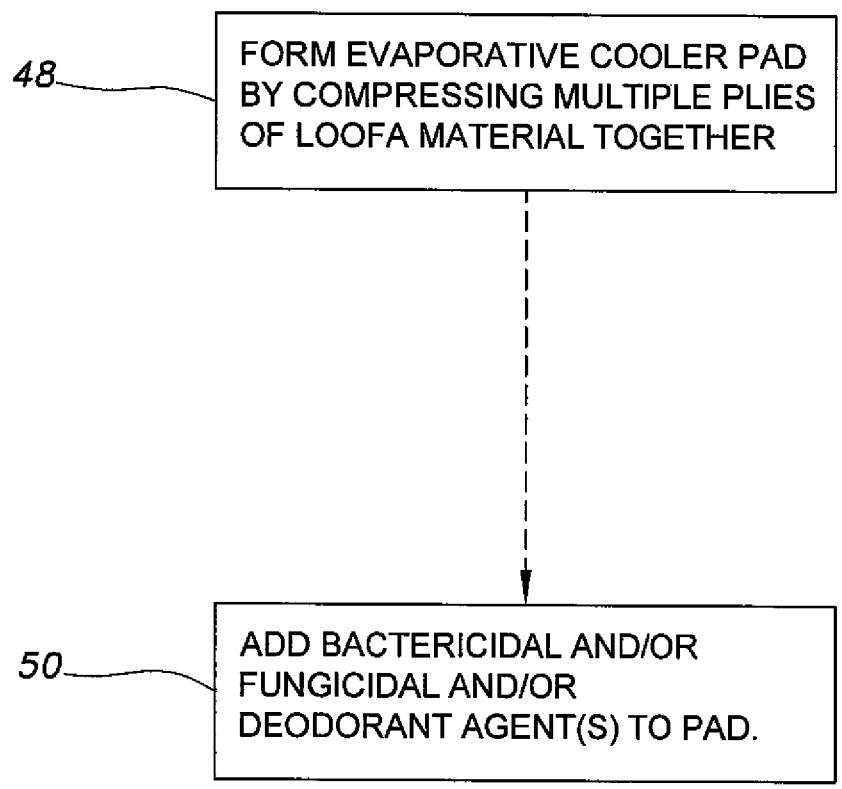
FIG. 2 is a flowchart describing the basic steps in a method of manufacturing an evaporative cooler pad according to the present invention.

The evaporator pads 20 used with the evaporative cooler are preferably formed of a specific species of luffa plant, i.e., *Luffa aegyptiaca*, as noted further above. The luffa is processed to form the evaporator pads 20. The process is described very generally in the steps of the method of manufacture of the pads noted in FIG. 2 of the drawings. Initially, a sufficient number of the dried luffa fruits are gathered to form several sheets or plies. The fibers are pressed or otherwise cohesively assembled to form the sheets or plies. At this point, the dried luffa sheets or plies are relatively porous and low in density, and do not provide optimum filtration of airflow therethrough or retention of water therein for effective evaporation by the air flowing therethrough. Accordingly, a plurality of sheets or plies of the material are pressed together to form a multiple ply evaporator pad, generally as indicated by the first step 48 in FIG. 2. This has two beneficial effects: (1) it compresses the total thickness of the pad to the desired thickness, and (2) it increases the density of the pad to the desired degree. It has been found through experimental testing that compressing the multiple ply luffa material to a density of about 175 milligrams per cubic centimeter results in a very efficient evaporator pad. This may require anywhere from two to four individual sheets or plies to form a finished pad having the proper thickness and the desired 175 mg/cm$^3$ density. When the above procedure has been completed, the multiple ply luffa pad is trimmed to the desired length and width for the desired application or installation in the cooler housing 12.

The provision of a device for dispensing antibacterial, antifungal, deodorant, and/or scent agents into the water of the cooler has been described further above. Alternatively, it is possible to treat the completed evaporator pads by applying the same or similar agents directly to the pads. This is provided for in the second step 50 of FIG. 2. This is a feasible means of providing such treatment in the event that no dispenser is provided in the cooler housing 12.

Accordingly, the various improvements described herein provide significantly improved efficiencies for an evaporative cooler and its evaporator pads. The specific luffa material of which the pads are formed results in much greater efficiency and longevity for the pads, as well as providing a more economical alternative to conventional pad material in many areas of the world. The means for treating the water and/or pads to eliminate undesirable bacteria, fungi, and/or odors also increases the value and utility of such evaporative coolers, particularly in those areas of the world with warmer climates and low humidity where such coolers operate most efficiently. The increased value and utility permits such coolers to be installed in lieu of air conditioner units, with a corresponding savings in operating and maintenance costs.

It is to be understood that the present invention is not limited to the embodiments described above, but encompasses any and all embodiments within the scope of the following claims.

I claim:

1. A refrigerator comprising: An evaporative cooler and pad, comprising:
    a hollow housing having at least one porous wall and an outlet, the housing defining an interior volume;
    a porous evaporator pad disposed within the housing immediately adjacent the porous wall, the porous evaporator pad consisting of a plurality of sheets of luffa sponge fibers;
    wherein the plurality of sheets of luffa sponge fibers are compressed together to form a multiple ply porous evaporator pad;
    a water reservoir disposed within the housing;
    a cooling fan disposed within the housing;
    a temperature probe and a thermostat coupled to the cooling fan and sensing a water temperature of the water reservoir;
    wherein the temperature probe and the thermostat selectively actuate the cooling fan to blow air over the surface of the water reservoir when the water temperature is at a predetermined level;
    a water pump disposed within the housing, the water pump selectively drawing water from the water reservoir and delivering the water to the multiple ply porous evaporator pad;
    a motor and a driving fan disposed within the housing, the motor and the driving fan selectively drawing air through the porous wall and multiple ply porous evaporator pad and expelling the air through the outlet;
    an agent dispenser disposed within the housing; and
    an aseptic agent disposed in the agent dispenser, the agent dispenser being configured for selectively dispensing the aseptic agent into the water reservoir.

2. The evaporative cooler and pad according to claim 1, wherein the aseptic agent comprises an antibacterial agent.

3. The evaporative cooler and pad according to claim 1, wherein the aseptic agent comprises an antifungal agent.

4. The evaporative cooler and pad according to claim 1, wherein the aseptic agent comprises a deodorant.

5. The evaporative cooler and pad according to claim 1, further comprising a scent disposed in the agent dispenser, the agent dispenser being configured for selectively dispensing the scent into the water reservoir.

6. The evaporative cooler and pad according to claim 1, wherein the multiple ply porous evaporator pad has a density of 175 milligrams per cubic centimeter.

7. The evaporative cooler and pad according to claim 1, wherein the multiple ply porous evaporator pad is treated with an antibacterial agent dispersed into the water and delivered onto the luffa sponge fibers.

8. The evaporative cooler and pad according to claim 1, wherein the multiple ply porous evaporator pad is treated with an antifungal agent dispersed into the water and delivered onto the luffa sponge fibers.

9. The evaporative cooler and pad according to claim 1, wherein the multiple ply porous evaporator pad is treated with a deodorant dispersed into the water and delivered onto the luffa sponge fibers.

10. The evaporative cooler and pad according to claim 1, wherein the multiple ply porous evaporator pad is treated with a scent dispersed into the water and delivered onto the luffa sponge fibers.

11. A method of manufacturing a porous evaporative pad for an evaporative cooler, the evaporative cooler including:
   a hollow housing having at least one porous wall and an outlet, the housing defining an interior volume;
   the porous evaporator pad disposed within the housing immediately adjacent the porous wall, the porous evaporator pad being made from luffa sponge fibers;
   a water reservoir disposed within the housing;
   a cooling fan disposed within the housing;
   a temperature probe and a thermostat coupled to the cooling fan and sensing a water temperature of the water reservoir;
   wherein the temperature probe and the thermostat selectively actuate the cooling fan to blow air over the surface of the water reservoir when the water temperature is at a predetermined level;
   a water pump disposed within the housing, the water pump selectively drawing water from the water reservoir and delivering the water to the multiple ply porous evaporator pad;
   a motor and a driving fan disposed within the housing, the motor and the driving fan selectively drawing air through the porous wall and multiple ply porous evaporator pad and expelling the air through the outlet;
   an agent dispenser disposed within the housing; and
   an aseptic agent disposed in the agent dispenser, the agent dispenser being configured for selectively dispensing the aseptic agent into the water reservoir;
   wherein the method consisting of the step of:
      assembling a plurality of plies of luffa sponge fiber sheets together in a range from two to four sheets of luffa sponge fiber sheet, thereby forming the multiple ply porous evaporator pad;
      compressing the multiple ply porous evaporator pad of luffa sponge to a density of 175 milligrams per cubic centimeter; and
      trimming the compressed, multiple ply porous evaporator pad of luffa sponge, thereby forming the multiple ply porous evaporator pad for an evaporative cooler;
      selecting at least one agent from the group of additives consisting of bactericidal, fungicidal, and deodorant agents; and
      applying the at least one selected agent to the multiple ply porous evaporator pad.

12. An evaporative cooler and pad combination for cooling air, the combination comprising:
   a porous evaporator pad;
   the porous evaporator pad consisting of a plurality of two to four sheets of luffa sponge fibers, the plurality of sheets of luffa sponge fibers are compressed together to form a multiple ply porous evaporator pad having a density of 175 milligrams per cubic centimeter; and
   a cooler;
   the cooler consisting of:
   a hollow housing having at least one porous wall and an outlet, the housing defining an interior volume, the porous evaporator pad disposed within the housing immediately adjacent the porous wall;
   a water reservoir disposed within the housing;
   a cooling fan disposed within the housing;
   a temperature probe and a thermostat coupled to the cooling fan and sensing a water temperature of the water reservoir;
   wherein the temperature probe and the thermostat selectively actuate the cooling fan to blow air across the surface of the water reservoir when the water temperature is at a predetermined level;
   a water pump disposed within the housing, the water pump selectively drawing water from the water reservoir and delivering the water to the multiple ply porous evaporator pad;
   a motor and a driving fan disposed within the housing;
   wherein the motor and the driving fan selectively drawing air through the porous wall and multiple ply porous evaporator pad and expelling the air through the outlet;
   an agent dispenser disposed within the housing;
   a scent disposed in the agent dispenser, the agent dispenser being configured for selectively dispensing the scent into the water reservoir; and
   an aseptic agent disposed in the agent dispenser, the agent dispenser being configured for selectively dispensing the aseptic agent into the water reservoir;
   wherein the aseptic agent is selected from the group consisting of an antibacterial agent, an antifungal agent, and a deodorant;
   wherein the multiple ply porous evaporator pad is treated with the scent dispersed into the water and delivered onto the luffa sponge fibers, and the aseptic agent dispersed into the water and delivered onto the luffa sponge fibers.

* * * * *